(No Model.) 2 Sheets—Sheet 1.
S. MALTBY.
MEANS FOR TRANSMITTING POWER.
No. 301,380. Patented July 1, 1884.
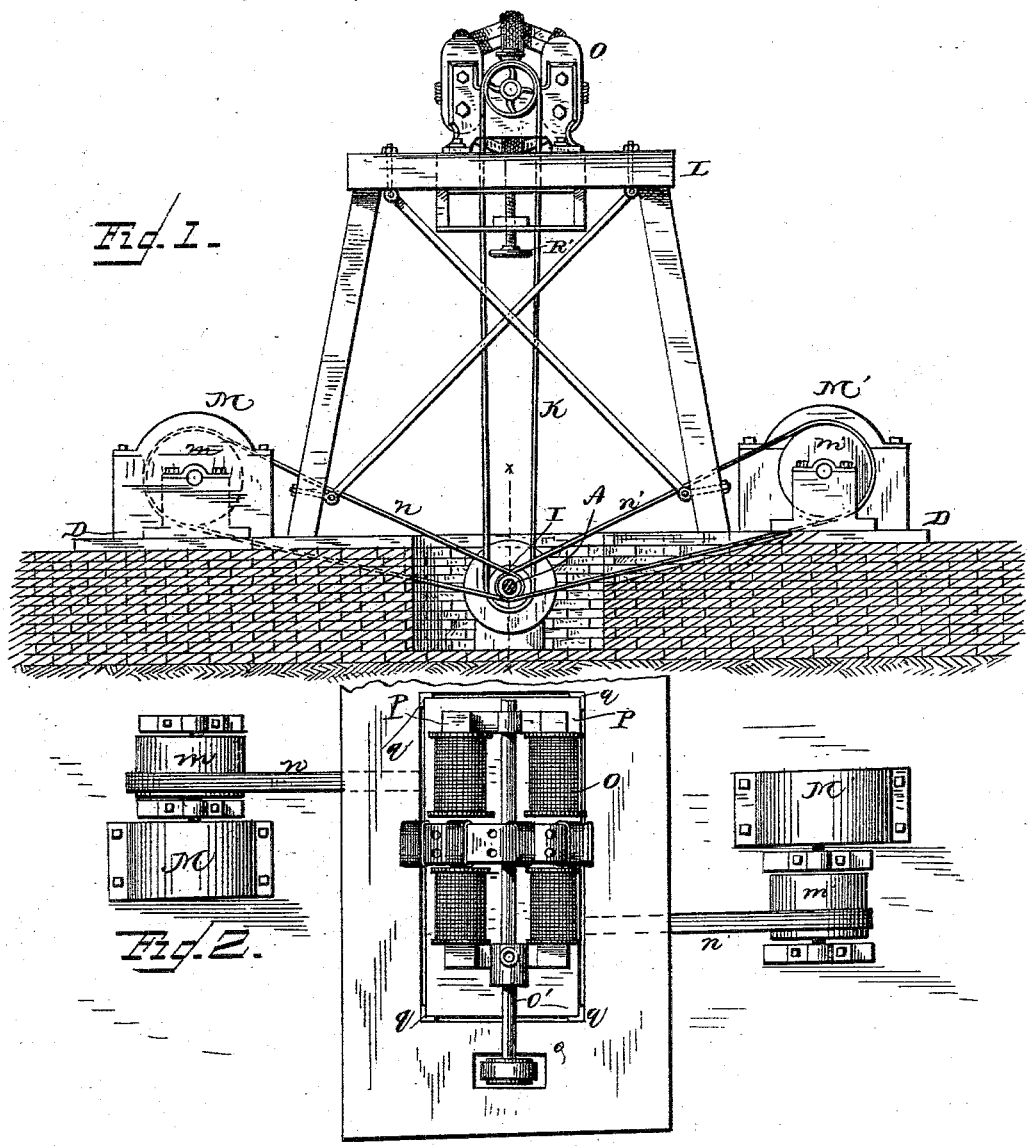
WITNESSES
Franck L. Ourand
Alex Scott
INVENTOR
Sidney Maltby,
by W. B. Hale,
Attorney

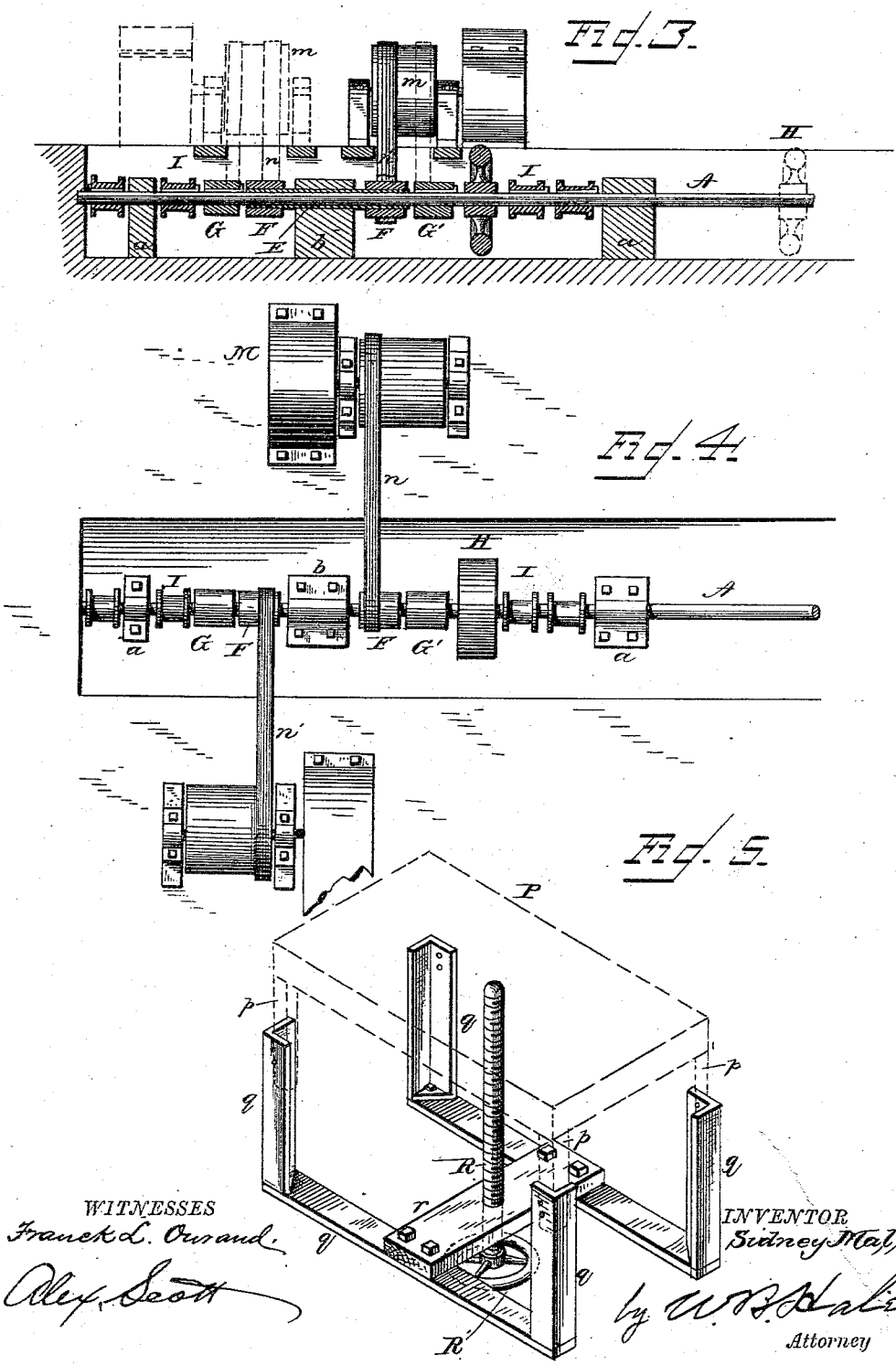

UNITED STATES PATENT OFFICE.

SIDNEY MALTBY, OF WASHINGTON, DISTRICT OF COLUMBIA, ASSIGNOR, BY DIRECT AND MESNE ASSIGNMENTS, OF TWO-THIRDS TO EDWARD L. LAMBIE AND SAMUEL R. BOND, BOTH OF SAME PLACE.

MEANS FOR TRANSMITTING POWER.

SPECIFICATION forming part of Letters Patent No. 301,380, dated July 1, 1884.

Application filed January 4, 1884. (No model.)

*To all whom it may concern:*

Be it known that I, SIDNEY MALTBY, a citizen of the United States, residing at Washington, in the District of Columbia, have invented certain new and useful Improvements in Means for Transmiting Power, of which the following is a specification, reference being had therein to the accompanying drawings.

My invention relates to improved means for transmitting power from motive engines to machinery, its object being to secure uniformity of motion in machinery driven at high speed, and to avoid the irregularity so common to fast-running machinery when driven by power-transmitting devices as heretofore used between the motive engines and machinery to be driven.

My invention is especially applicable for transmitting motion of high velocity from steam-engines to dynamo-electric machines and similar machines which are required to run at high speed, and in which it is essential that their motion should approach as nearly as possible to absolute uniformity.

My invention will be fully understood from the following particular description in connection with the accompanying drawings, in which—

Figure 1 is a view, partly in elevation and partly in section, of an arrangement of power-transmitting devices constructed according to my invention and applied to driving a dynamo-electric machine. Fig. 2 is a plan view of the driven machine as mounted upon its adjustable base or platform. Fig. 3 is a section on the line $x$ $x$, Fig. 1, omitting, however, the elevated platform and its supports. Fig. 4 is a plan view of the monitor-shaft and the driving-engines connected therewith. Fig. 5 is a detail perspective view of the guides and adjusting devices of the machine to be driven.

The letter A designates a monitor-shaft or counter-shaft mounted in bearings in standards $a\ a$ and $b$, which are located in a pit, C, below the level of the floor D. This shaft has ordinary bearings in the standards $a\ a$, and its bearing in the standard $b$ consists of a stationary sleeve, E, supported by said standard, and projecting on opposite sides thereof a sufficient distance to receive two loose pulleys, F and F', which have the same diameter as two adjacent pulleys, G and G', which are keyed to the monitor-shaft. Upon this monitor-shaft are also fixed one or more balance-wheels, H, and power-transmitting pulleys I I, from which suitable belts may run to machines to be driven by the shaft, as shown at K', such machines being mounted upon an elevated platform, L, so that their driving-belts will run vertically from the monitor-shaft.

Upon opposite sides of the monitor-shaft are arranged revolving steam-engines M and M', the driving-pulleys $m$ of which are connected with the monitor-shaft by belts $n$ and $n'$, which may connect either with the fixed pulleys G and G' upon the shaft or be shifted upon the loose pulleys F and F', which run upon the sleeve E.

In the present instance I have shown my improved power-transmitting devices applied to driving a dynamo-electric machine, as shown at O; but they may be applied to any other machine requiring a high speed, such machines being mounted similarly to the dynamo-electric machine, as shown. This machine, it will be observed, is mounted upon a platform, P, as seen in the plan view, Fig. 2, and shown detached in dotted lines in Fig. 5. This platform or base is arranged in an opening of similar shape formed in the elevated platform L. This opening has at its four corners the downwardly-projecting angle-iron guides $q$, in which fit the legs $p$ of the base P. The lower ends of the guides $q$ are connected in pairs by bars $q'$, which support a cross-bar, $r$, through which works an adjusting-screw, R, having fixed to its lower end a hand-wheel, R', while its tip is arranged to strike under the center of the platform P, so that when the adjusting-screw is driven upward the platform P and the machine which it supports will be raised, and thus any desired tension may be given to the belt K, which connects the driving-pulley I of the monitor-shaft with the pulley $o$ on the shaft O' of the dynamo-electric machine, and when it is desired to throw said machine out of action it may be lowered sufficiently to so relax the belt K that it will not drive said machine. It will be obvious also that if only two engines are used any driven machine may be thrown out of action by shifting the driving-belts of the engines upon the loose pulleys F and F', which run upon the sleeve E.

It is desirable that the belt-pulleys shall be so proportioned that the monitor-shaft shall run two or three times as fast as the shaft of the driven machine—that is, if the shaft of the machine is required to make one thousand revolutions in a given time the monitor-shaft should make two or three thousand revolutions in the same time—this arrangement being made in order that any slight irregularities of the monitor-shaft will not be felt at regular periods by the driven machine.

It will be observed that the vertical belt K, when placed under tension, to a great extent supports the monitor-shaft, so that the same will run lightly in its bearings, and will not wear the bearings so much as would be the case if the lifting or supporting effect of the vertical belt were absent. It will also be observed that as the two driving-belts $n$ and $n'$ draw in opposite directions upon the monitor-shaft there will be no lateral strain upon the bearings of said shaft and comparatively little sidewise wear.

The sleeve E forms an extended bearing for the monitor-shaft, while at the same time supporting the loose pulleys F and F', so that when the driving-belts are on these pulleys their running will have no tendency to cause any vibratory motion to said shaft.

While in the drawings I have shown but two driving-engines arranged to drive the monitor-shaft, and have shown but one machine arranged to be driven by said shaft, it will be understood that I may use a series of pairs of engines for driving said shaft, and may extend the elevated platform L, and mount thereon any desired number of machines to be driven by power transmitted through said monitor shaft and belts, the same as shown in the drawings. It will be seen that in such an arrangement if one or more of the engines become disabled, they may be readily disconnected from the shaft for repair without interfering with its continuity of motion, as those engines which are in order will drive the shaft while the others are being repaired.

I propose to use a separate boiler for each pair of engines, though I do not confine myself to such an arrangement.

Having now described my invention and explained the operation thereof, I wish it to be understood that I do not confine myself to the precise details of construction, as shown in my drawings, but may vary the same in any manner for the better carrying out of my invention without departing from the essential principles thereof. For instance, instead of steam-engines, I may use any other suitable motors, and I may place all of the motors on one side of the monitor-shaft if it should be more convenient.

What I claim is—

1. The combination, with the monitor-shaft, of the driving-engines arranged on opposite sides of the same, and connected therewith by belts, and a machine to be driven arranged above said monitor-shaft, and connected therewith by a belt, substantially as described, as and for the purpose set forth.

2. The combination, with the monitor-shaft and suitable means for driving the same, of the driven machine arranged above said shaft, the vertical belt connecting said machine with said shaft, and means for vertically adjusting said machine for regulating the tension of said belt, substantially as described.

3. The combination, with the monitor-shaft and its supports, of the fixed pulleys G and G', secured to said shaft, the extended sleeve-bearing E, and the loose pulleys F and F', carried by said sleeve, substantially as described.

4. The combination, with the monitor-shaft, of the extended sleeve-bearing E, the loose pulleys carried by said sleeve, the fixed pulleys G and G', secured to said shaft at opposite ends of said sleeve, the driving-engines M and M', arranged on opposite sides of said shaft, and the driving-belts $n$ and $n'$, connecting said engines with said shafts, and adapted to be shifted to either the said fixed pulleys on the shaft or the loose pulleys on the sleeve, substantially as described.

5. The combination, with the monitor-shaft provided with the pulleys, and arranged for connection as described, of one or more balance-wheels, H, as set forth.

6. The combination, with the elevated platform L, having the opening and depending guides, of the base or platform P, carrying a machine to be driven, and provided with legs to move in said guides, of the suitably-supported adjusting-screw arranged to raise and lower said platform, substantially as and for the purpose set forth.

In testimony whereof I affix my signature in presence of two witnesses.

SIDNEY MALTBY.

Witnesses:
  J. R. BRICKHEAD,
  W. B. HALE.